United States Patent [19]

Eckloff

[11] 4,317,157

[45] Feb. 23, 1982

[54] LOCKING DEVICE FOR UTILITY LOCKS WITH A KEY SIGNAL TRANSMITTER AND A KEY SIGNAL RECEIVER

[76] Inventor: Martin Eckloff, Ziegelweg 4, 8951 Irsee, Fed. Rep. of Germany

[21] Appl. No.: 71,358

[22] Filed: Aug. 30, 1979

[30] Foreign Application Priority Data

Aug. 31, 1978 [DE] Fed. Rep. of Germany ....... 2838056

[51] Int. Cl.$^3$ ......................... E05B 49/00; H04Q 3/00

[52] U.S. Cl. ............................. 361/172; 340/825.69; 361/186

[58] Field of Search ....................... 361/172, 186, 184; 340/543, 695, 696, 694

[56] References Cited

U.S. PATENT DOCUMENTS 3,852,722 12/1974 Neuville ............................ 361/172
3,872,435 3/1975 Cestaro .............................. 361/172
3,979,647 9/1976 Perron et al. ....................... 361/172
4,189,712 2/1980 Lemelson ........................... 340/543

FOREIGN PATENT DOCUMENTS 994866 8/1976 Canada ............................... 340/695
1901912 7/1970 Fed. Rep. of Germany .
2051198 4/1972 Fed. Rep. of Germany .
2250368 4/1973 Fed. Rep. of Germany .
2324392 5/1973 Fed. Rep. of Germany .
2604188 11/1977 Fed. Rep. of Germany .
2824421 12/1979 Fed. Rep. of Germany ...... 361/172
2023899 1/1980 United Kingdom .

OTHER PUBLICATIONS

"Das Lichtgesteurte Sicherheitsschioss", *Hobby Magazine,* No. 5, 1969, pp. 107-110.

*Primary Examiner*—Patrick R. Salce
*Assistant Examiner*—L. C. Schroeder
*Attorney, Agent, or Firm*—Oblon, Fisher, Spivak, McClelland & Maier

[57] ABSTRACT

A locking device for utility locks having a lock bolt, wherein a key signal transmitter is disposed in a portable housing and a stationary key signal receiver is disposed in the vicinity of the lock bolt and controls the operation of the lock bolt. The transmitter has a coder for generating a predetermined code specific to the locking device, and the receiver has a decoder for decoding the code generated by the coder. The transmitter coder employs a coding format in which a predetermined sequence of at least three pulses, characterized by at least three different pulse widths is transmitted to the receiver and decoded thereat to unlock the utility lock upon decoding of the predetermined sequence.

16 Claims, 8 Drawing Figures

Figure 1:
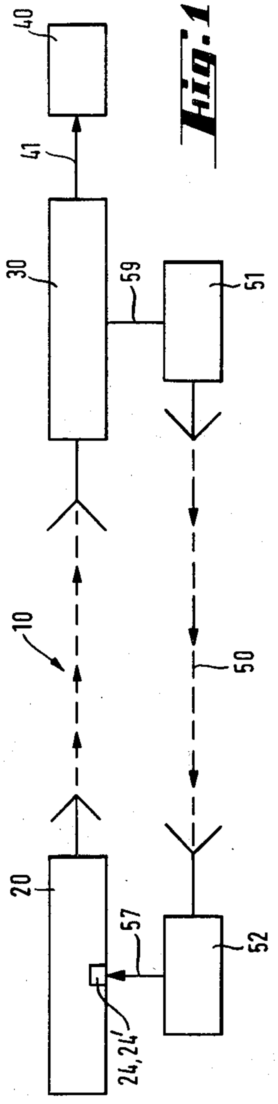

LOCKING DEVICE FOR UTILITY LOCKS WITH A KEY SIGNAL TRANSMITTER AND A KEY SIGNAL RECEIVER

The invention relates to a locking device for utility locks with a key signal transmitter, arranged in a portable housing, as well as a key signal receiver, in stationary arrangement within the area of the lock bolt and which, by means of its output signal controls said lock bolt, whereby the key signal transmitter is provided with a coder specific to the locking device and having a corresponding decoder.

This type of locking device is known from DE-OS (German Disclosure Document) No. 2 324 392. In this known locking device of record the key signal transmitter transmits a wireless signal to the key signal receiver, whereby the coder and the corresponding decoder are designed in such a manner that the coder emits different frequencies in a predetermined order, which, after checking them for their accuracy, are utilized by the decoder for the opening of the lock. The key signal transmitter and the key signal receiver may be so small in their dimensions, making use of solid state elements, that they are not larger than the usual known mechanical keys and cylinder locks. This has the advantage that the key signal transmitter may be arranged inside the housing of a wrist watch. Thereby the key signal transmitter takes the place of the key and the key signal receiver takes the place of the cylinder lock of a purely mechanical locking device. A selective coordination or adjustment of transmitter and receiver assure the needed security, so that the locking device of this type, just as a purely mechanical locking apparatus, may be activated by authorized persons only. In particular, a locking device of this type makes it unnecessary to take a key in hand and to introduce it into the—often very small—key hole, in order to open the lock, which is often difficult, particularly in darkness and for people with visual difficulties or persons with tactile paralysis. The locking device of this type may also be designed as a key signal device emitting ultrasonic waves, together with an appropriate key signal receiver. This design would have the advantage that electro-magnetic wave bands as they are so often used for transmissions, must not be used in this case, and these wave bands would not cause any radio interference. In putting the transmitted waves which radiate into the air into the area of the frequency of ultrasonic sound, accoustical annoyance or interferences respectively are avoided. Instead of a design utilizing ultrasonic waves, however, the locking device of record may also be designed so as to transmit and receive electro magnetic waves. This measure would include the advantage of making an electro-acoustical modulator unnecessary. To prolong the life of the energy storage means required for the key signal transmitter, said storage means may be connected to the key signal transmitter by way of a switch. Such a switch would make it possible to make the key signal transmitter operable only if and when the use of the device is intended. Prolonging the life of the energy storage means for the key signal transmitter would increase the ease of handling the key signal device, resulting in a less frequent necessary replacement of the energy storage means of the key signal transmitter or may be even the entire key signal transmitter. The key signal transmitter may also be of a fully automatic design and emit the coded signals only when a trigger signal is emitted by a switch signal tripper unit located in the area of the stationary lock, or, respectively, only when such a signal has been received by a actuator control unit arranged in the area of the key signal transmitter. Again, ultrasonic waves as well as electro magnetic waves are suitable for the transmission of such trigger signals. A design which arranges the switch signal trigger unit in the area of the stationary door lock in connection with the switch control unit will have the advantage of the key signal transmitter automatically switching on when approaching the key signal receiver, making the mechanical activation of a switch key or any similar device superfluous. In addition, the arrangement of the switch trigger unit in the area of the stationary key signal receiver and the switch control unit in the area of the portable key signal transmitter would make sure that the two signal paths are located relatively close to each other, thus a response of the receiver of the one signal path guaranteeing a response of the receiver of the other signal path. The key signal thus essentially uses the same signal path as the switch trigger signal. The aforementioned design and arrangement of the switch actuating units greatly increase the manageability of the locking device of this type, inasmuch as such an improved locking device may be handled by totally paralyzed persons who might be confined to a wheelchair. It will, at any rate, make sure that the well-known bothersome search for the key, common with ordinary mechanical locking devices, is no longer required. In providing the possibility to house the key signal transmitter of a locking device of this type inside the housing of a wrist watch, the further advantage is added that said key signal transmitter is always located within an easily accessible area of the haptic region. It is further assured that the key signal transmitter, if attached as designed to the arm of a human being, is located at about the height which is customary for door locks. This again makes sure that the key signal transmitter and the key signal receiver can be brought close together without any great difficulty.

The known locking device of this type, however, has the disadvantage that several generators must be used for the different frequencies and/or frequency modulators must be utilized. Added thereto with the use of electro-magnetic waves for the transmitter signals, there is a high susceptibility to interferences by reception of external frequencies emitted by electronic or electrotechnical equipment which may by chance be located in the vicinity of the locking device.

In this instance also, the selection of transmitter frequencies is very limited because of the already overloaded frequency band and strict postal regulations.

A locking device with a key signal transmitter for the wireless opening of a door lock is described in the magazine "Hobby" 1969, No. 5, pp. 107 to 110. This article also points up the problem of coding, or the safeguarding of the locking device against misuse. Here the problem is solved by modulating the light of a flashlight to a modulation frequency between 1000 and 2000 Hz, and beamed to a phototransistor with a subsequent resonance filter. This article therefore teaches that coding should be done by selection of frequency.

From DE-OS No. 2 604 188 and 2 250 368 additional locking devices having a key signal transmitter and a key signal receiver are known, whereby the key signal is also coded by means of frequencies of frequency band sectors respectively.

The invention is based on the task of improving a locking device of the described type in such a manner that, while retaining as far as possible its existing advantages, it will become possible to make the coding still simpler and still less influenced by interference.

This task is solved by the invention by providing the coder-decoder portion with an impulse generator in the coder and an element switched between the impulse generator and the transmitter which modulates the incoming impulses one after the other according to a predetermined code in their width.

This solution has the advantage that —with the exception of the carrier frequency—coding is entirely independent from the selection of certain frequencies. Thus an interference by external frequencies is reduced to a minimum. On the other hand, any desired degree of security can be achieved by a variation of the number and the width of the predetermined basic impulses.

It is true that DE-OS No. 1 901 912 already has described an electronic locking and key device in which the key signal consists of impulses. But it does not relate to a locking device for the wireless opening of a lock, or a door, respectively, since in order to open the lock an "electronic key"—just as a common metal key for purely mechanical locking devices—must be inserted into the lock. This electronic locking and key device of record therefore has the initially listed disadvantages connected with the necessity of the introduction of keys into key holes. Further, for this locking and key device two impulse generators which are related to each other must be provided for each coded impulse, one of them in the key device, the other in the lock device. Thus, with the use of only two impulses with a coded width, four impulse generators become necessary. This leads to a complicated circuit with high energy consumption.

In the locking device of the invention, the use of a square waver generator as the impulse generator has the advantage that a square wave generator may be easily realized with particular simple means, as, for instance a RC-section. The advantage of a most economical production of the coder is granted by designing it in such a manner that a digital counter is driven by the square wave generator, said digital counter is followed by a digital decoder and a unit for the alteraton of the impulse widths is driven by the digital decoder, whereby said digital decoder counts up to the predetermined number of impulses to be coded, the digital decoder having outputs equal to the said predetermined number, each decoder output driving a different monostable flip-flop and the first input of a double stage AND-gate, each monostable flip flop step with its output being connected to the second input of the AND-gate to which it is ordered by way of the decoder-outputs, and each output of each AND-gate being led exactly to an input of an OR-gate. When coding by means of X impulses, the digital counter is designed in such a manner that it will count from 1 to X and then starts from the beginning, while the digital decoder has X outputs. An alteration of the width of the impulses which issue in series from the digital decoder, i.e. an essential part of the coding specific to the client or to the locking device is done by a unit consisting merely of monostable flip-flops and double-stage AND-gates. Very simple elements suffice for this circuit since an essential part of the coding is done by suitable switching of monostable flip-flops or univibrators with AND-gates. Also, the coding of the impulse group or the impulse train respectively can be altered by exchanging even a single monostable flip-flop with a monostable flip-flop of different characteristics. The simple fact that the delay time of each single monostable flip-flp stage is adjustable at will results in any desired number of coding possibilities by the alteration of merely one monostable flip-flop.

The immediate transmitter part is switched after the coder and is designed preferably as a modulated, key-equipped HF-transmitter. Thus, the coder effects a quasi modulation of the carrier frequency of the transmitter.

Preferably, the decoder is preceded by a HF-receiver having a narrow-band filter for the carrier wave to increase safe-guarding against unauthorized use and with a pulse restorator for the improvement of the interference distance. To further increase safeguarding against unauthorized use of the locking device, the decoder is also provided with a time-out member which, whenever a false impulse is given and/or after the time required by the predetermined impulse has elapsed blocks the output of the decoder for a pre-set time and thus blocks the possibility of unlocking the lock. Such a false impulse registers as soon as a single impulse of the entire impulse train is registered by the decoder as being false. The time-out member has the function to thwart efforts to unlock the locking device by means of simulated key impulses. If necessary, the time-out member may be connected by way of a counter to an alarm mechanism, whereby the counter, upon registering a pre-determined number of unauthorized opening attempts, drives the alarm mechanism to sound a warning, or, if applicable, a full alarm.

In a preferred embodiment, the decoder has a digital counter and, corresponding to the digital decoder of the coder a digital counter and digital decoder with X outputs and X double stage AND-gates, whereby each AND-gate with its first input together with precisely one digital decoder output and with its second input is arranged at a common distributing main, connected with the HF-receiver output. Each AND-gate drives one impulse-width-decoder. X bistable storage flip-flops, so-called RS-flip-flops are clearly ordered to the x impulse width decoders. The outputs of all of the RS flip-flops thereby are connected by way of a common AND-gate with x stages, whereby preferably the AND-gate, by means of a hold circuit, for instance in the form of a monostable flip-flop, acts upon the relay which activates the lock bolt. Here, in detail, the output of the first impulse-width decoder—this decoder belongs with the first impulse or synchro-impulse respectively —is connected directly with the S-Gate of the first RS-flip-flop and with the R-Gate of this flip-flop by means of a delay member. The output of each additional impulse-width decoder, thus of the second to the x-th impulse-width decoder hereby is located at one input of a double-stage AND-gate. The other input of the aforementioned AND-gate is connected with the output of the immediately previously driven RS-flip-flop. Thereby the output of the n-th RS-flip-flop is connected with the (n+1)th impulse-width decoder by way of the AND-gate, whereby the output of this AND-gate with the S-input is led towards the (n+1)th RS-flip-flop. Also, in this embodiment, the R-inputs of all RS-flip-flops are located at a common distributing main.

Preferably, the time-out member with its input is arranged parallel to the R-inputs of the RS-flip-flops at the distributing main, and with its output it is connected with the outputs of the RS-flip-flops by way of the AND-gate having X stages and being located at the output side.

In the device of the invention also, a switch signal trigger unit is provided which preferably is arranged in the area of the key signal receiver, and in a fixed arrangement, said signal trigger giving a trigger signal to the switch control unit arranged in the key signal transmitter. The locking device of this invention is further protected against unauthorized manipulation by the switch signal trigger unit and the switch control unit being selectively attuned to each other. This results in the additional effect that the key signal transmitter becomes operative only within the area of the key signal receivers to which it is specifically tuned.

Safeguarding against misuse may be improved by manufacturing the wall of the housing of the key signal transmitter of a material which is selectively permeable for the carrier wave of the key signal. This results in a strong filtering of the carrier wave from the transmitter side, which wave will be specific to the device and may be, for instance, a supersonic wave. This measure has the advantage that the key signal receiver can be tuned very narrowly to the carrier wave, or rather filtered. In expanding this idea, the wall of the housing preferably is constructed of material selectively permeable for the carrier wave of the switch signal emitted by the switch signal trigger unit. This makes sure that the key signal transmitter reacts only within the area of its specifically related key signal receiver but not within the area of other key signal receivers. In the case of different carrier waves of the switch signal and of the key signal, the wall of the housing may be constructed in part of material selectively permeable for the carrier wave of the switch signal and in part of material permeable for the carrier wave of the key signal.

In a preferred embodiment, the frontal wall of the housing is outwardly concave, whereby the transmitter antenna is fastened to the inner surface of the frontal wall. By this measure, a particularly large angle of radiation is ascertained, while the rest of the housing is radio-opaque.

With the use of diagrammatic drawings, embodiments of the invention are described in detail as follows:

The drawings show in

Figure 2:
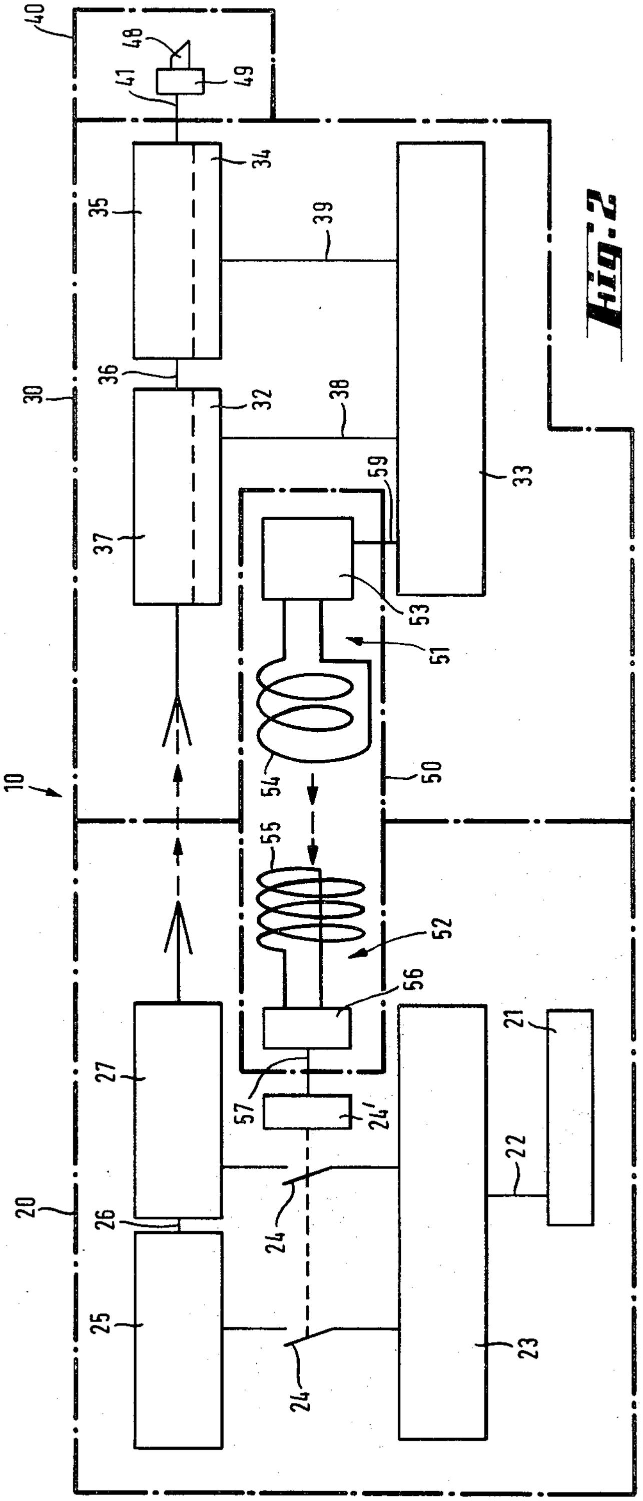
Figure 3:
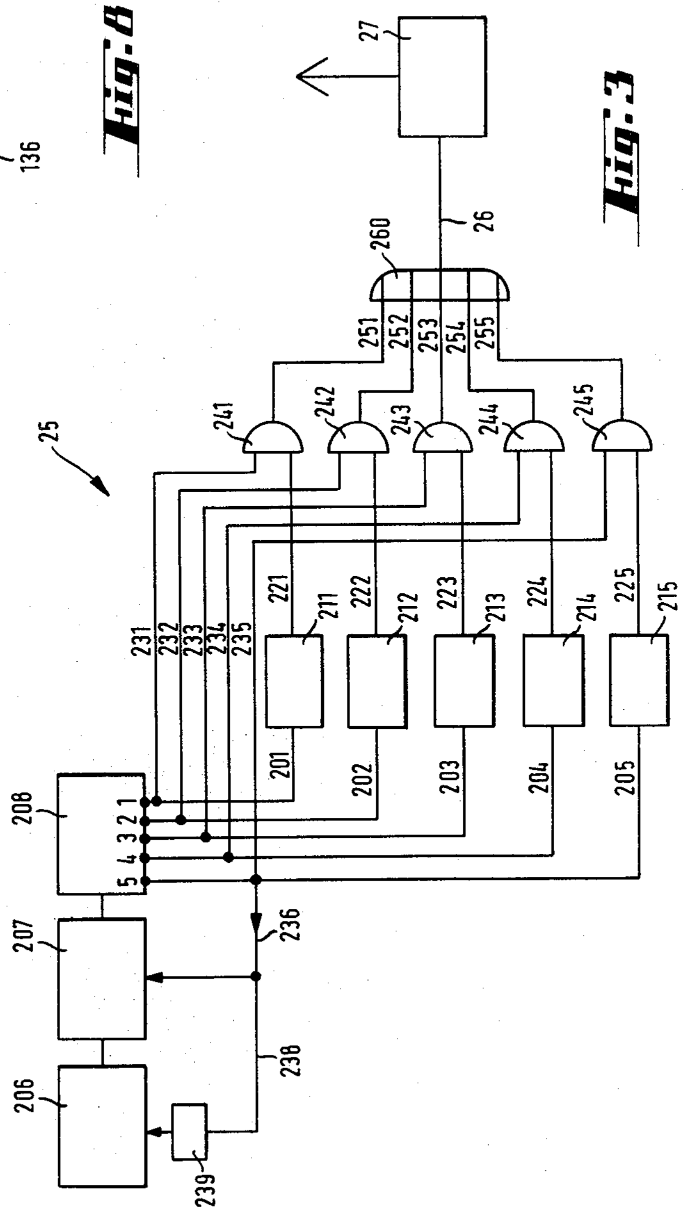
Figure 7:
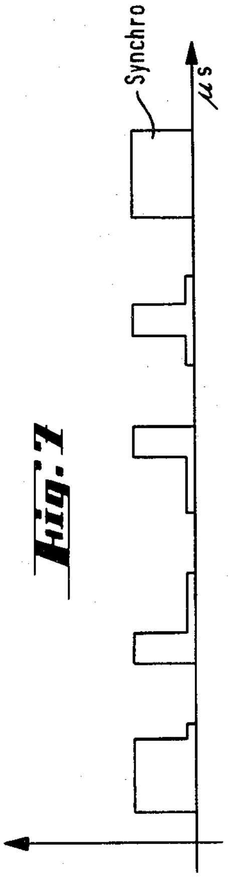
Figure 4:
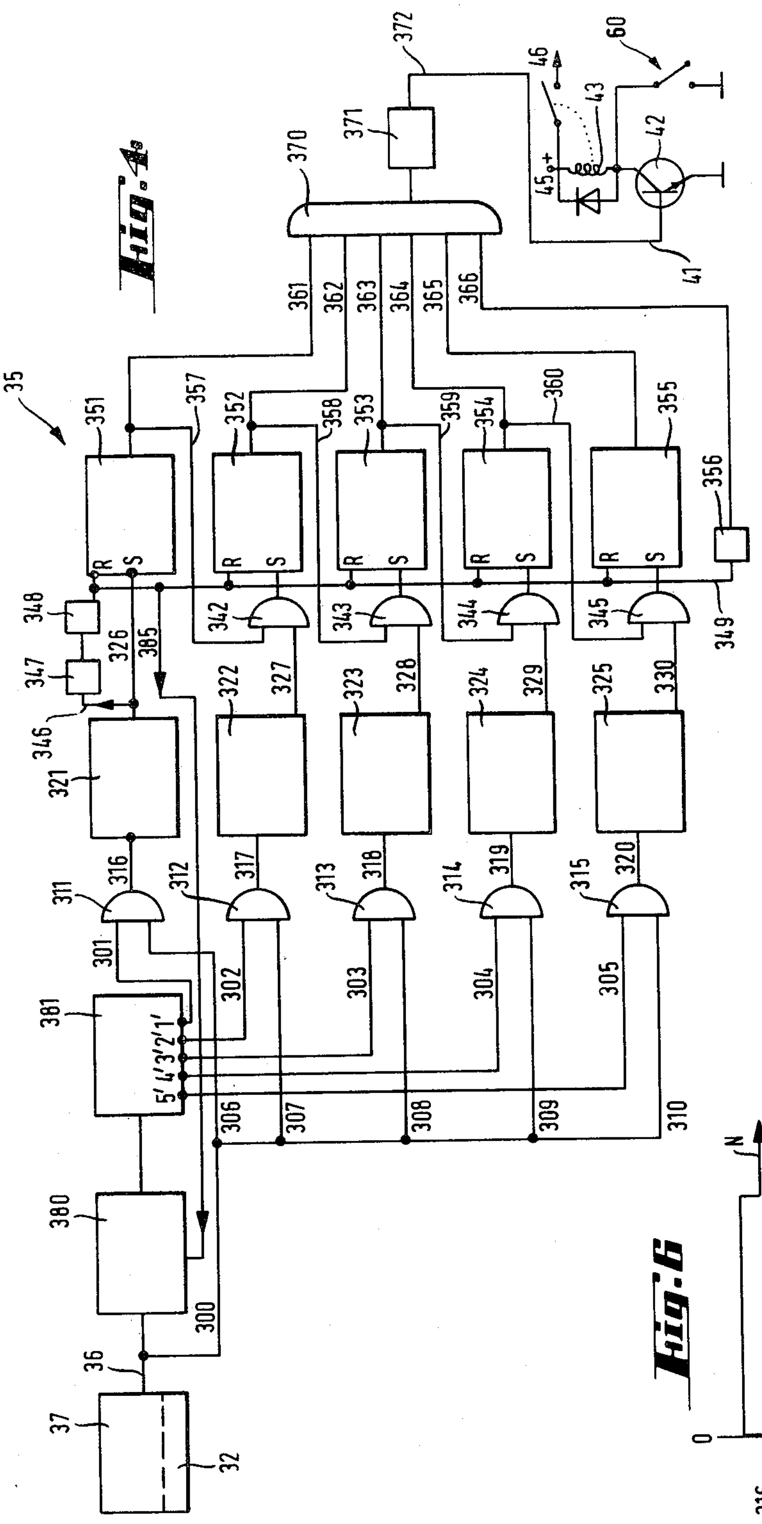
Figure 5:
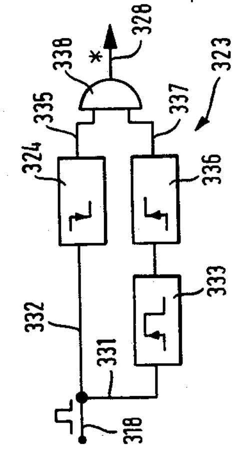
Figure 6:
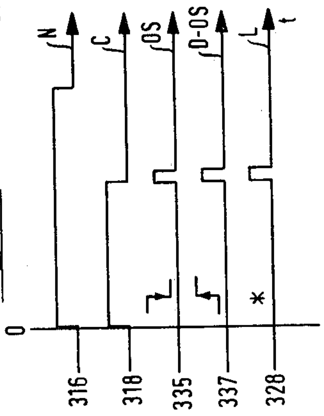

FIG. 1 a diagram of a signal-flow diagram of an embodiment of the invention;

FIG. 2 a block circuit diagram of the embodiment shown in FIG. 1;

FIG. 3 a diagram of the key signal transmitter circuit;

FIG. 4 a diagram of the key signal receiver circuit and the circuit for the locking device lock;

FIG. 5 a circuit diagram for an impulse-width decoder;

FIG. 6 a presentation of the impulse-relations in the impulse-width decoder;

FIG. 7 a coded impulse group; and

Figure 8:
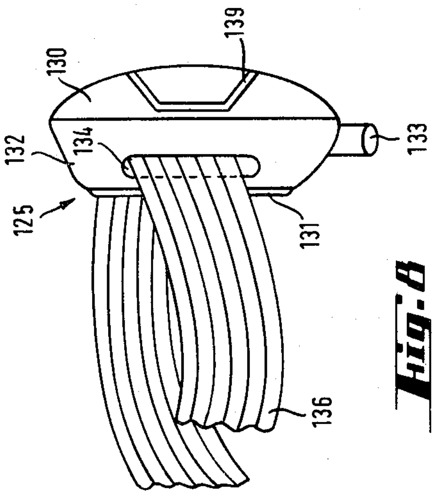

FIG. 8 an embodiment of a portable key impulse transmitter.

According to FIG. 1 the locking device 10 has a key signal transmitter 20, a key signal receiver 30 connected therewith by way of a signal path for freely expanding waves, and a locking circuit for the locking device 40 connected in sequence behind said key signal receiver 30 by way of a control connection 41. Further, a switch transmitter 51 is connected by way of a supply line 59 with the key signal receiver 30. The switch transmitter 51 by way of a free signal path 50 is connected with the switch receiver 52. The switch receiver 52 drives the key signal transmitter 20 by way of a switch control line 57 and a switch 24, 24'.

The key signal transmitter 20 and the switch receiver 52 with switch 24, 24' are arranged inside of a portable housing 125 FIG. 8). The key signal receiver 30 together with the switch transmitter are stationary and arranged in the area of the locking circuit for the locking device 40 or the door lock respectively. The door lock in this case may be the lock of a house, an apartment door, a garage door or the door of a car.

According to FIG. 2 the key signal transmitter 20 has a generator 21 to produce electrical energy. The oscillating weight generator 21 may be designed according to the principle of the oscillating weight generators in so-called automatic watches, self-winding watches. The kinetic energy translated into electrical energy in the oscillating weight generator 21 by induction is led to an electrical energy storage 23 by way of an electrical conductor 22 and is stored until called up.

Instead of the oscillating weight generator 21 together with its energy storage 23, miniature batteries may be used to supply the key signal transmitter with electricity. These batteries have the disadvantage that sooner or later they will have to be replaced, whereby their life depends among other things upon the frequency of the use of the key signal transmitter, as well as on the elements used in building the transmitter.

The electric energy store 23 by way of a switch 24 may be connected with a coder 25 and a transmitter for electromagnetic waves, namely a HF-transmitter 27. The coder 25 is designed as a unit for the alteration of impulse widths and is called impulse width coder. By way of modulation, respectively a key line 26 it drives the HF-transmitter 27 in such a manner that the impulse train leaving the HF-transmitter 27 or the impulse group emitting from the HF-transmitter respectively are beamed to the HF-receiver 37 in coded form.

The key signal receiver 30 also is provided an energy supply part 33 as a source of electrical energy. If the key signal receiver 30 is part of a locking device for the door of a house or an apartment, the public electric power supply net is a suitable source of energy. Instead of it, or in addition, a storage battery or any other storage means, particularly electrical energy for emergency supplies may be used.

The energy supply part 33 by way of a supply line 38 feeds an HF-receiver 37 which is sharply tuned to the HF-transmitter 27, which receiver represents the first portion of the key signal receiver 30 in the direction of the signal flow. Corresponding thereto, the HF-transmitter 27 represents—in the direction of the signal flow—the last portion of the key signal transmitter 20. The HF-receiver 37 in addition is equipped with a narrow-band filter for the carrier waves and a restorator unit for the coded impulses. Thereby, the selectivity or the tuning respectively is increased and the distance from external interferences becomes greater.

The output of the HF-receiver 37 by way of a receiver line 36 is connected with the input of a decoder 35 for the purpose of decoding the width of the impulses received by the HF-receiver 37. The decoder 35 is also equipped with a time-out member 34 which is activated whenever the time set for the predetermined impulse group to pass through the decoder 35 has elapsed.

The decoder 35 at its output side drives the locking device's locking circuit 40 by way of the control connection 41. The decoder 35 receives its electrical energy from the energy supply part 33 by way of a supply line 39. The locking device's locking circuit 40 has a control circuit 49 and a bolt 48, controlled by the control circuit 49.

Aside from the coupling of the signal lines between the HF-transmitter 27 and the HF-receiver 37, an additional coupling between the key signal receiver 30 and the key signal transmitter 20 is provided, namely the coupling as described in FIG. 1 of the switch transmitter 51 with the switch receiver 52 through the signal path 50.

Here, the switch transmitter 51 has an induction coil 54 which is being fed by way of an excitation circuit 53. In the direction of the signal flow, the induction coil 54 represents the output portion of the switch transmitter 51. In the direction of the signal flow, the switch receiver 52 at its input side has an induction coil 55 with a subsequently arranged control member 56. The switch transmitter 51 and the switch receiver 52 are sharply attuned to each other. As an example, the excitation circuit 53 and the control member 56 each have filters which match each other. The control member 56 by way of a switch control line 57 drives an activating switch part 24' to activate switches 24.

Pursuant to FIG. 3 the coder 25 is fed by a square-wave generator 206 to alter the impulse widths. As this square-wave generator 206 a vibrating flip-flop switch, for instance an astable multivibrator is well suited. The square-wave generator 206 drives the digital counter 207 which counts from 1 to 5 each time and then returns to the starting point. The output impulses of the digital counter 207 are led to a digital decoder 208, having five outputs, 1, 2, 3, 4 and 5.

The output 1 of the digital decoder by way of an impulse-coder line 201 is connected with the input of a monostable flip-flop 211, or a univibrator, respectively. Also, said output 1 of the digital decoder 208 is connected with the input of a double-stage AND-gate 241, using control line 231. The AND-gate 241 combines the value present at the output 1 of the digital decoder 208 with the output value of the monostable flip-flop. For this purpose, the output of the monostable flip-flop 211 through output line 221 is at the second input of the AND-gate 241. The output of the AND-gate 241, by way of the output line 251 is led to one input of an OR-Gate 260. The OR-gate 260 in the embodiment shown in an OR-gate with five inputs and in the following will be called a five-stage OR-gate 260. The combination signal issued by the OR-gate 260 by way of the key line 26 is taken to the HF-transmitter 27. Also, each output 2,3,4, and 5, respectively of the digital decoder 208 is connected by an impulse coding line 202, 203, 204, and 205, respectively, with the input of exactly one monostable flip-flop 212, 213, 214, and 215, respectively. In addition, each digital-decoder output 2, 3, 4, and 5, respectively, is connected with the input of exactly one two-stage AND-gate 242, 243, 244, and 245, respectively through a corresponding line 232, 233, 234, and 235, respectively. Each monostable flip-flop 211, 212, 213, 214 and 215, respectively, at their output side are connected with the other input of exactly one aforementioned double-stage AND-gate. The outputs of the double-stage AND-gates 242, 243, 244, and 245, respectively, by way of output lines 252, 253, 254 and 255 respectively are located at exactly one input of the five-stage OR-gate 260.

The monostable flip-flops 211 to 215 after an initial impulse are activated for a certain period of time, and then return to their original position. The variation of the impulse width is achieved in pre-setting separate individual switch-times of the monostable flip-flop for each locking device and for each single flip-flop.

The output 5 of the digital decoder 208 is further connected to a re-setting line 236 leading to the digital counter 207 and a holding stage 239 preceding the square-wave generator 206, as an example, a monostable flip-flop by way of a connection 238. The holding stage 239 interrupts for a pre-determined time the energy supply of the square-wave generator 206 and corresponds to the time-out member 356 in the decoder 35. (FIG. 4).

According to FIG. 4 the decoder 35 which is driven by the HF-receiver 37, at its input side has a digital counter 380, counting from 1 to 5, and a digital decoder 381 arranged after the digital counter 380, in particular a BCD-decoder with outputs 1', 2', 3', 4', 5'. The outputs 1' to 5' of the digital decoder 381 are each connected with exactly one two-stage-AND-gate 311, 312, 313, 314 and 315, respectively, by lines 301, 302, 303, 304, and 305, respectively. The free input of the double stage AND-gates 311 to 315 by way of a control line 306, 307, 308, 309 and 310 are located at a common line 300, encompassing the receiver line 36 between the HF receiver 37 and the digital counter 380.

The first AND-gate 311 shown here, which, by way of the line 301 is connected with the output 1' of the digital decoder 381, and by way of line 306 is connected with the common line 300, may be omitted. In that case, the control line 306 is taken directly to the input of a subsequent impulse-width decoder 321.

The outputs of the AND-gates 311 to 315 through test lines 316, 317, 318, 319, and 320, respectively, are each taken exactly to one impulse-width decoder 321, 322, 323, 324, and 325, respectively.

The output of the impulse-width decoder 321 which decodes the first impulse, the so-called synchro-impulse, by way of an exit line 326 is taken to the S-input of an RS-storage flip-flop, or a RS-flip-flop 351 respectively. Further, the output of the impulse-width decoder 321 by way of a branch line 346 is connected with a monostable delay-flip-flop 347 and a subsequent monostable flip-flop 348, to create a short impulse. The output of the monostable short-impulse flip-flop 348 is located at the R-input of the RS-flip flop 351. This R-input connects by way of a common line 349 the R-inputs of four additional RS-flip-flops 352, 353, 354 and 355. Further, a monostable flip-flop 356 is switched parallel to the R-inputs of the RS-flip-flops 351 to 355, acting as a time-out member. The outputs of all of the RS-flip-flops 351 to 355, as well as the output of the monostable flip-flop 356 are connected by means of a five-stage AND-gate 370. For this purpose, each of the aforementioned outputs is connected with exactly one input of the AND-gate 370 by way of a line 361, 362, 363, 364, 365, and 366, respectively.

The outputs needed for the second to the fifth impulse of the impulse-width decoder 322 to 325 are located by way of output lines 327, 328, 329, 330 each at the input of a double-stage AND-gate 342, 343, 344 and 345. In doing so, each impulse-width decoder 322 to 345 is assigned exactly one input of exactly one AND-gate 342 to 345.

The second input of the AND-gate 342 to 345 is assigned to the outputs each of the previously driven RS-storage-flip-flops 351 to 354. Hereby exist by way of the RS-output branch lines 357, 358 359 and 360, clear connections between the output of one RS-flip-flop 351, 352, 252 and 354 each and the free input of exactly one AND-gate 342, 343, 344 and 345. Each of these AND-gates 342 to 345 is located with their output side at the S-input of exactly one second to fifth RS-flip-flops 352 to 355.

The second to the fifth RS-flip-flop thus is set exactly whenever the previously touched RS-flip-flop has been set and whenever the second to the fifth impulse width decoder 322 to 325 has simultaneously decoded the received impulse as being "in order". Should an impulse be registered as being "wrong", no control signal to open the door lock is issued because of the AND-combination of outputs 361 to 365 of the RS-flip-flops 351 to 355.

After the five impulses as shown in the embodiment have elapsed, the delay-switch, consisting of the monostable delay flip-flop 347 and the monostable short-impulse flip-flop 348, resets the R-inputs of the RS-flip-flops 351 to 355, whereby the time-out member 356, designed as a monostable flip-flop, and the AND-gate 370 lock for a predetermined time span. At the same time, the holding stage 239 (FIG. 3) interrupts the power supply to the square-wave generator 206 of the coder 25.

From the common line 349, a re-setting line 385 for the re-setting of the digital counter 380 leads to its re-setting input. The AND gate 379 is followed by a holding circuit in form of a monostable flip-flop 317, which, as soon as it receives the free signal of the AND-gate 370, activates the base of a transistor 42 through the control line 372 or 41, respectively. The power transistor 42 is part of the locking circuit of the entire locking device. This locking device 40 also has a relay coil 43 located at the collector of the power transistor 42. The emitter of the power transistor 42 is grounded and point 45, located away from the collector, of the relay coil 43 has a positive potential. A protective diode 44 is switched parallel to the relay coil 43. The relay coil 43 activates a bow 46, directly acting upon bolt 48.

In case that there should be a break-down in the locking device of the invention, a switch 60 is provided in parallel arrangement to the power transistor 42 and located between the collector and the emitter. This switch is mechanically operable and preferably by means of a common safety key with a safety cylinder lock. Therefore, should the key signal transmitter be lost or be defective, or else the key signal receiver have difficulties, the locking circuit of the locking device 40 may nevertheless be activated, simply by using a mechanical safety lock in the accustomed manner.

According to FIG. 5 the impulse-width decoder 323 has two parallel test lines 331 and 332. In test line 332, a monostable flip-flop 334 is provided, reacting to the declining edge of the coded impulse. The output of the monostable flip-flop 334 by way of the output line 335 is taken to the input of a double-stage AND-gate 338. Within the test line 331, a delay circuit in the form of a monostable flip-flop 333 is provided. The monostable delay flip-flop 333 corresponds to the monostable flip-flop 213 in the coder 25 of the key signal transmitter 20. The monostable delay flip-flop 333 reacts to the leading edge of the impulse to be coded. The monostable flip-flop 333 is followed by another monostable flip-flop 336 which also reacts to the leading edge. The output of said flip-flop by way of a line 337 is connected with the other input of the AND-gate 338. The two monostable flip-flops 334 and 336 may be short-impulse flip-flops. At the output of the AND-gate 338, the combined signal is encompassed, and it is HIGH precisely when both monostable flip-flops 334 and 336 simultaneously give their short impulses to the AND-gate 338. FIG. 6 shows the impulse relations in the synchro-line 316, the input line 318 of the impulse width decoder 232, the input lines 335 and 337 of the AND-gate 338 in the impulse-width decoder 323 and the output line 328 of the impulse width decoder 323. The letters N; C; OS; D-OS and L mean in the given order normal, or uncoded impulse, respectively; coded impulse; short impulse; delayed short impulse; and logically combined impulse.

FIG. 7 shows an impulse group coded by coder 25 of the key signal transmitter and transmitted by HF-transmitter 27. Here, the first impulse is the syncho-impulse.

FIG. 7 clearly shows how many code-possibilities are given with as little as five impulses combined in an impulse group. If the number of impulses for each impulse group or impulse train respectively is increased, the coding possibilities increase accordingly. Coding of the impulse group is achieved by pre-determining the number of the individual impulses for each impulse group, the width of the individual impulse and/or the sequence of the individual impulses within the impulse group. Inasmuch as the width of the individual impulse is variable at will, for instance by means of the described monostable flip-flops, a great variety of different code patterns results.

FIG. 8 shows a key signal transmitter 20, built into a portable housing 125. Here, the housing 125 is designed as a round wrist-watch housing which, by way of holding devices 134 attached thereto, is connected with a wrist band 136. In detail, the housing 125 has a frontal wall 130, a bottom 131 and a lateral wall 132. Protruding from lateral wall 132 is an activating key 133, to activate switch 24. The housing is made of material which is selectively permeable to the carrier frequency of the key signal and the carrier frequency of the switch signal. The frontal wall 130 is concave towards the outside. Arranged in its center, the antenna 139 of the HF-transmitter 27 is located at the inside of said frontal wall. The constructive units of the individual circuits are solid state elements in highly integrated form (LSI). Particularly suitable are monolithic circuits in metal-oxide semiconductor structure (MOS) while using complementary transistors (NPN+PNP). These CMOS-circuits show low energy losses, little sensitivity to interference and good reaction speed, as well as high temperature resistance.

I claim:

1. In a locking device for utility locks having a lock bolt; wherein a key signal transmitter is disposed in a portable housing and a stationary key signal receiver is disposed in the vicinity of the lock bolt and controls the operation of the lock bolt, said transmitter having a coder for generating a predetermined code specific to the locking device, said receiver having a decoder for decoding the code generated by said coder, the improvement comprising:

said coder comprising, an impulse generator for producing pulses at a constant pulse repetition rate, and pulse width modulation means coupled to said impulse generator for producing a key pulse upon each generation of a pulse by said impulse generator, each key pulse having a pulse width selected between predetermined limits within the period determined by the pulse repetition rate of said impulse generator, said pulse width generator producing a predetermined sequence of key pulses characterized by at least three different pulse widths; and said decoder comprising means for decoding the predetermined sequence of said key pulses characterized by said at least three different pulse widths.

2. A locking device as in claim 1 wherein the impulse generator is a square-wave generator.

3. A locking device as in claim 2 wherein the pulse width modulation means comprises a digital counter driven by the square-wave generator, a digital decoder switched subsequent to the digital counter and a unit for the alteration of impulse-widths driven by the digital decoder, whereby the digital counter counts up to the predetermined number of impulses to be coded, the digital decoder having a number of outputs identical to the above number and each decoder output having a different monstable flip-flop driving the first input of a double-stage AND-gate, each monstable flip-flop with its output being connected to the second input of the AND-gate to which is ordered by way of the decoder outputs, and each output of each AND-gate being led to exactly one input of an OR-gate.

4. A locking device as in claim 1 or 2, wherein said coder is followed by a HF-transmitter producing a carrier wave modulated by said key pulses.

5. A locking device as in claim 4, wherein the HF-transmitter is modulated and keyed.

6. A locking device as in claim 5 wherein said decoder is preceded by a HF-receiver with a narrow-band filter for the carrier wave and an impulse restorator.

7. A locking device as in claim 1 or 2, wherein said decoder has a time-out member which locks the output of said decoder for a certain space of time if a wrong impulse has been received and/or after the time required for the coding of the predetermined number of impulses has elapsed.

8. A locking device as in claim 7, wherein said decoder has a digital counter and a digital counter corresponding to the digital decoder of said coder and a digital decoder with outputs, a number of two-stage AND-gates identical to the number of decoder outputs whereby each with its first input is located together with exactly one decoder output and with its second input at a common line connected with the output of the HF-receiver, one each impulse width decoder driven by exactly one AND-gate, one each RS-flip-flop connected subsequent to each impulse-width decoder and one AND-gate connecting the outputs of the RS-flip-flops, whereby the output of the impulse-width decoder belonging with the first impulse (synchro-impulse) being connected with the S-input of the first RS-flip-flop directly, and with the R-input by way of a delay member, the output of each additional impulse-width-decoder being connected with the output of the RS-flip-flop which has been triggered immediately before, and by way of a double-stage AND-gate, the output of said AND-gate being connected with the S-input of exactly one of the additional RS-flip-flops, and the R-inputs of all of the RS-flip-flops lying parallel along a common line.

9. A locking device as in claim 8, wherein the time-out member has its input lying parallel to the R-inputs of the RS-flip-flops along the common line and has its output connected with the outputs of the RS-flip-flops by means of the AND-gate.

10. A locking device as in claim 1 or 2, further comprising:

power switches at the key signal transmitter, and a trigger means in stationary arrangement within the area of the key signal receiver for issuing a switch signal communicated to the transmitter and a switch control unit arranged within the portable housing and responding to the switch signal.

11. A locking device as in claim 10, wherein the transmitter includes means for modulating a carrier wave with said key pulses, the modulated carrier being transmitted to the receiver as a key signal, and wherein the portable housing is designed as the housing of a wrist watch, the wall of the portable housing being made of material which is selectively permeable for the carrier wave of the key signal.

12. A locking device as in claim 11 wherein the switch signal is transmitted via a carrier wave to the transmitter and wherein the wall of the portable housing is made of material selectively permeable for the carrier wave of the switch signal.

13. A locking device as in claim 12, wherein the wall of the portable housing consists in part of material permeable selectively for the carrier wave of the key signal and consist in part of material permeable selectively to the carrier wave of the switch signal.

14. A locking device as in claim 13 wherein the portable housing comprises a frontal wall which is outwardly concave in shape, the transmitter having an antenna fastened to an inner side of the frontal wall.

15. A locking device as in claim 14 further comprising an energy storage unit arranged in the portable housing of said transmitter and by way of a switch connectable with the key signal transmitter.

16. A locking device as in claim 14 wherein the energy storage unit at the transmitter is preceded by an oscillating weight generator.

* * * * *